United States Patent

Iwasaki et al.

[11] Patent Number: 5,887,124
[45] Date of Patent: *Mar. 23, 1999

[54] IMAGE PROCESSING APPARATUS AND METHOD IN WHICH A RESTRICTION PROCESS IS PERFORMED ACCORDING TO COLOR COMPONENT VALUES

[75] Inventors: Osamu Iwasaki, Tokyo; Naoji Otsuka, Yokohama; Kentaro Yano, Yokohama; Kiichiro Takahashi, Kawasaki; Hitoshi Nishikori, Kawasaki; Daigoro Kanematsu, Yokohama, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 711,953
[22] Filed: Sep. 6, 1996

[30] Foreign Application Priority Data

Sep. 8, 1995 [JP] Japan .................................. 7-231276

[51] Int. Cl.⁶ ........................... H04N 1/50; H04N 1/60
[52] U.S. Cl. ........................ 395/109; 358/502; 358/518; 358/529
[58] Field of Search ..................... 395/109; 358/502, 358/529, 518, 530; 347/9, 16, 43

[56] References Cited

U.S. PATENT DOCUMENTS

| | | | |
|---|---|---|---|
| 4,595,948 | 6/1986 | Itoh et al. | 358/502 |
| 5,225,849 | 7/1993 | Suzuki et al. | 358/296 |
| 5,353,387 | 10/1994 | Petschik et al. | 395/109 |
| 5,488,398 | 1/1996 | Matsubara et al. | 347/43 |
| 5,515,479 | 5/1996 | Klassen | 395/109 |
| 5,608,549 | 3/1997 | Uami | 358/530 |

FOREIGN PATENT DOCUMENTS

| | | |
|---|---|---|
| 0372826 | 6/1990 | European Pat. Off. . |
| 0376209 | 7/1990 | European Pat. Off. . |
| 0580376 | 1/1994 | European Pat. Off. . |
| 3-69371 | 3/1991 | Japan . |
| 5-14650 | 1/1993 | Japan . |

*Primary Examiner*—Scott Rogers
*Attorney, Agent, or Firm*—Fitzpatrick, Cella, Harper & Scinto

[57] ABSTRACT

There is provided an image processing apparatus constructed by an input device for inputting image data constructed by a plurality of color components, a restriction processing unit for executing a restricting process for restricting so as not to exceed a predetermined value for the image data constructed by the plurality of color components so that a quantity of each recording material which is used in an image recording unit doesn't exceed a predetermined quantity and an output device for outputting the image data subjected to the restricting process to the image recording unit, wherein the restriction processing unit processes on the basis of the predetermined value according to a feature of the input image data.

22 Claims, 9 Drawing Sheets

IMAGE PROCESSING APPARATUS AND METHOD IN WHICH A RESTRICTION PROCESS IS PERFORMED ACCORDING TO COLOR COMPONENT VALUES

BACKGROUND OF THE INVENTION

1. Field of the Invention

The invention relates to image processing apparatus and method for performing an image process in which a quantity of recording material is limited.

2. Related Background Art

In an ink jet recording system, an ink containable quantity in a recording medium is determined by characteristics of the recording medium. Particularly, in case of a color recording, when the recording exceeding a limit of the ink containable quantity of the recording medium is executed, a blur occurs at the boundary of each color.

Now, assuming that an ink droplet forming one pixel has a quantity of 40 pl (picoliter) per color, an emission or implantation quantity of the ink droplet per area is equal to about 220% in case of a normal paper, about 280% in case of a coated paper, about 300% in case of an OHP sheet for ink jet, and 340% in case of a glossy film for ink jet. As mentioned above, the emission or implantation quantity of ink differs every recording medium.

A recording technique for increasing or decreasing an ink emission or implantation quantity per area by modulating a size of emission droplet in accordance with the kind of recording medium has been proposed.

There has also been proposed a recording technique such that a ratio at which a pixel to form a black dot is generated is set to a value that is equal to or larger than a generation ratio at which yellow, magenta, and cyan dots are generated in the same pixel and a process to emit or implant none of the yellow, magenta, and cyan dots is performed to the pixel into which the black dot is emitted or implanted.

There has also been proposed a recording technique such that the minimum value (undercolor) in the multivalue levels of yellow, magenta, and cyan in one pixel is converted into a multivalue level of black and a conversion amount is subtracted from the multivalue levels of yellow, magenta, and cyan in one pixel.

However, in case of the ink jet recording system, it is difficult to modulate the ink emission quantity by an amount of about 30% in one ink droplet emitting mechanism, so that the recording apparatus cannot help having a complicated construction.

In case of the method of generating a black pixel in correspondence to the generation ratio at which yellow, magenta, and cyan dots are generated in the same pixel or the method of converting a part of the undercolor into black, it is impossible to restrict an emission or implantation quantity of the secondary color which is expressed by only yellow and magenta, cyan and yellow, or magenta and cyan.

SUMMARY OF THE INVENTION

The invention is made in consideration of the above drawbacks and it is an object of the invention to perform a restricting process suitable for input image data.

Particularly, an object of the invention is to execute a restricting process effectively using a color gamut of an output device.

To accomplish the above objects, according to the invention, there is provided an image processing apparatus comprising: input means for inputting image data constructed by a plurality of color components; restriction processing means for executing a restricting process for restricting so as not to exceed a predetermined value for the image data constructed by the plurality of color components so that a quantity of each recording material which is used in an image recording unit doesn't exceed a predetermined quantity; and output means for outputting the image data subjected to the restricting process to the image recording unit, wherein the restriction processing means processes on the basis of the predetermined value according to a feature of the input image data.

There is also provided an image processing apparatus comprising: input means for inputting image data constructed by a first plurality of color components; undercolor removing processing means for removing an undercolor for the image data constructed by the first plurality of color components and generating image data which is constructed by the first plurality of color components and in which the undercolor was removed; generating means for generating image data which is constructed by a second plurality of color components and which is different from the image data of the first plurality of color components on the basis of the image data in which the undercolor was removed; and restriction processing means for performing a process to restrict so as not to exceed a predetermined value on the basis of the image data constructed by the second plurality of color components and the undercolor.

The above and other objects and features of the present invention will become apparent from the following detailed description and the appended claims with reference to the accompanying drawings.

DETAILED DESCRIPTION OF THE PREFERRED EMBODIMENTS

Embodiments of an image processing system of the invention will now be described in detail hereinbelow with reference to the drawings.

Figure 1:
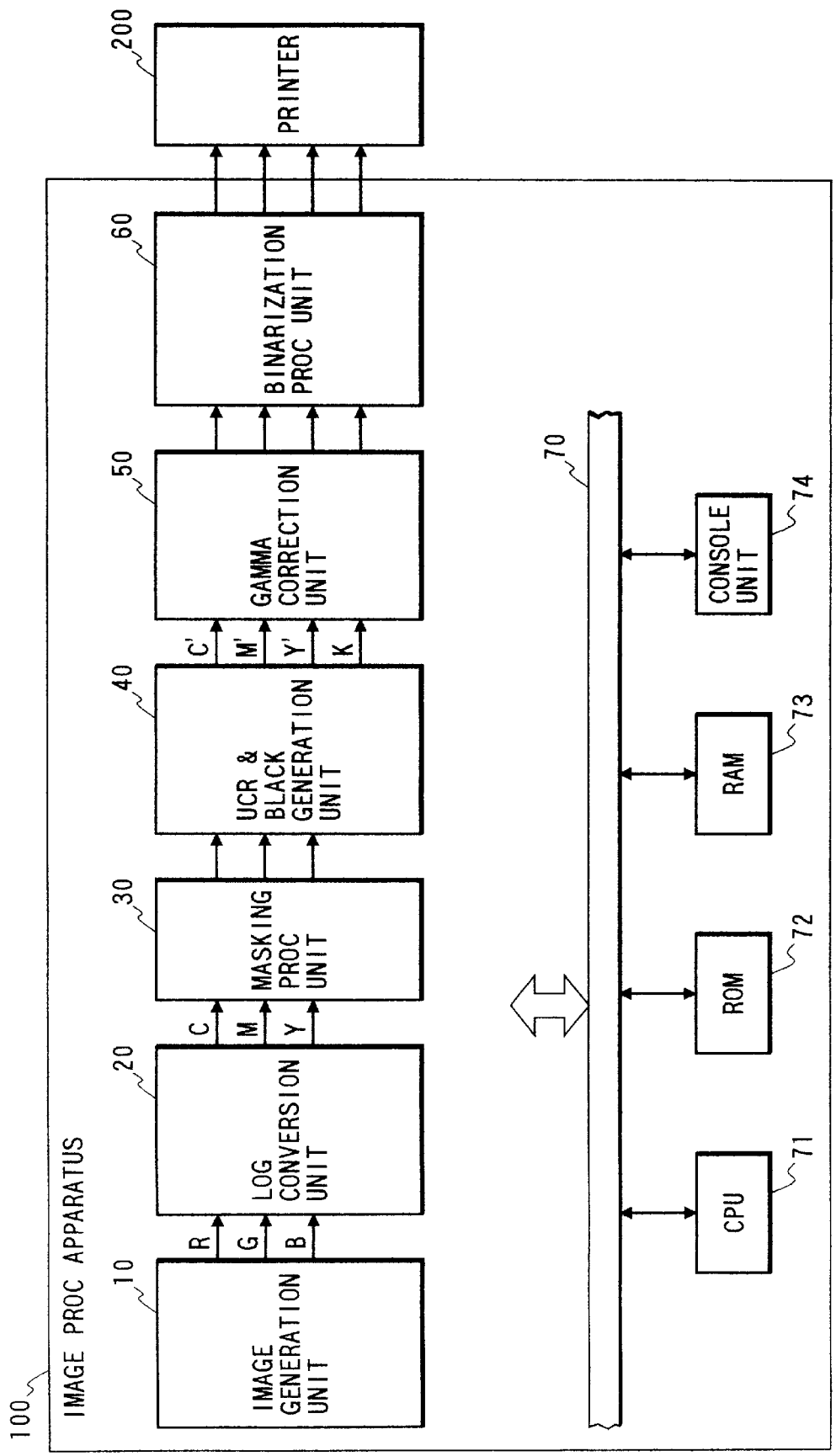
FIG. 1 is a block diagram showing an example of an image processing system according to the invention.

FIG. 1 is a schematic diagram showing an example of a construction of an image processing system.

The image processing system is constructed by an image processing apparatus 100 and a printer 200. Another device such as monitor, scanner, or the like can be also connected to the image processing apparatus 100.

The image processing apparatus 100 will be first described.

An image generation unit 10 generates image data of R, G, and B indicative of an arbitrary image by using a proper application (DTP software) or the like.

An LOG conversion unit 20 executes a luminance/density conversion to the RGB image data and outputs CMY image data.

A masking processing unit 30 executes a color correction by using a matrix arithmetic operation on the basis of characteristics of inks which are used in the printer 200.

A UCR & black generation unit 40 executes a UCR process and a black generating process, which will be explained hereinlater, on the basis of the inputted CMY image data and generates C'M'Y'K image data.

A gamma correction unit 50 executes a gradation correcting process, which will be explained hereinlater, to each component.

A binarization processing unit 60 binarizes each image data shown by a multivalue for each of the inputted CMYK components by using a dither process and an error diffusing process.

Each of the above units is controlled by a CPU 71 connected through a CPU bus 70.

The CPU 71 controls each unit by using an RAM 73 as a work memory on the basis of programs stored in an ROM 72. When each processing condition is set by the user from a console unit 74, each unit is controlled on the basis of such a processing condition.

The printer 200 will now be described.

The printer 200 forms an image onto a recording medium by an ink jet recording system by using a head and a recording material (ink) provided every component of C, M, Y, and K.

Specifically speaking, there is used a serial recording system such that the recording is executed while moving the recording head in which a plurality of nozzles are arranged in the sub scanning direction in the main scanning direction, and when the recording of one line is finished, the recording medium is moved in the sub scanning direction, the recording head is returned to the recording start position and the recording of the next line is again performed, and in a manner similar to the above procedure, the recording of one page is executed.

In such a printer, in order to form an image at a high resolution, a dot diameter of the recording head is not changed but the recording head is moved in the main scanning direction at a pitch that is the half of the ordinary pitch, so that a resolution in the main scanning direction can be apparently doubled.

Figure 2:
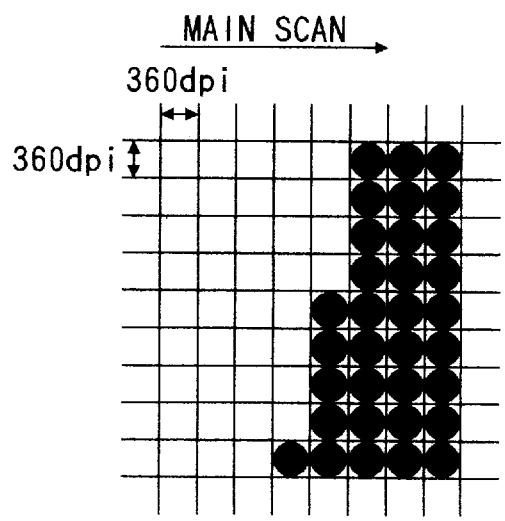
FIG. 2 is a diagram showing an example of a recording method in a low resolution recording.
Figure 3:
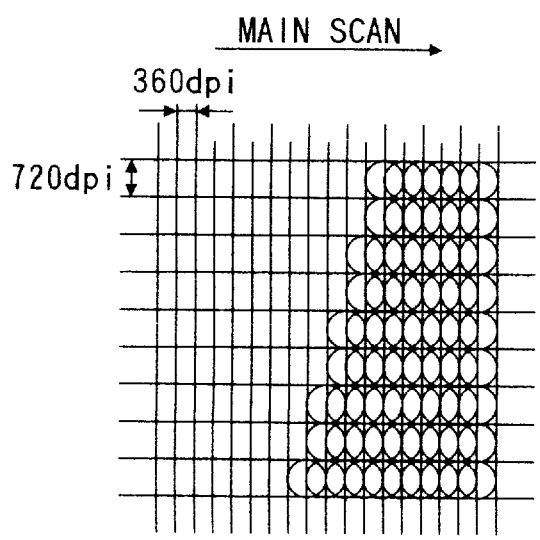
FIG. 3 is a diagram showing an example of a recording method in a high resolution recording.

Namely, when recording at a low resolution such that resolutions in the (vertical direction×lateral direction) are equal to [360 dpi (dots per inch)×360 dpi], the dots are recorded as shown in FIG. 2. On the other hand, when recording at a high resolution of [720 dpi×360 dpi] by moving the recording head in the main scanning direction (lateral direction in this case) at the half pitch of the ordinary pitch, the dots are recorded as shown in FIG. 3.

However, since a size of ink droplet which is emitted from the recording head is designed so as to be a proper size at a low resolution, when the dots are recorded at a high resolution, the ink of a double quantity is deposited onto the recording material. There is, consequently, a possibility such that the ink overflows on the recording medium and a quality of an image to be formed deteriorates.

Image processes which can form an image without causing the recording material to overflow on the recording medium irrespective of the low resolution recording and the high resolution recording will now be described in detail as an embodiment hereinbelow. (Embodiment 1)

A flow of processes of the UCR & black generation unit 40, gamma correction unit 50, and binarization processing unit 60 in the image processing apparatus 100 according to the embodiment 1 will now be described with reference to FIG. 4.

Each processing unit is controlled on the basis of the control of the CPU 71 as mentioned above.

First, the image data of multivalue levels of yellow (Y), magenta (M), and cyan (C) is inputted (1001 to 1003).

In the embodiment, each of the Y, M, and C image data is expressed by eight bits, namely, values within a range from 0 to 255. First, a minimum value minCMY among the multivalue data of Y, M, and C is obtained therefrom (1004). A process to generate a multivalue level K of black from the value of minCMY is executed (1006). Now, assuming that a function to execute such a process is set to BGR( ), black bgrCMY to be formed is expressed by the following equation.

$$bgrCMY = BGR(minCMY)$$

Figure 6:
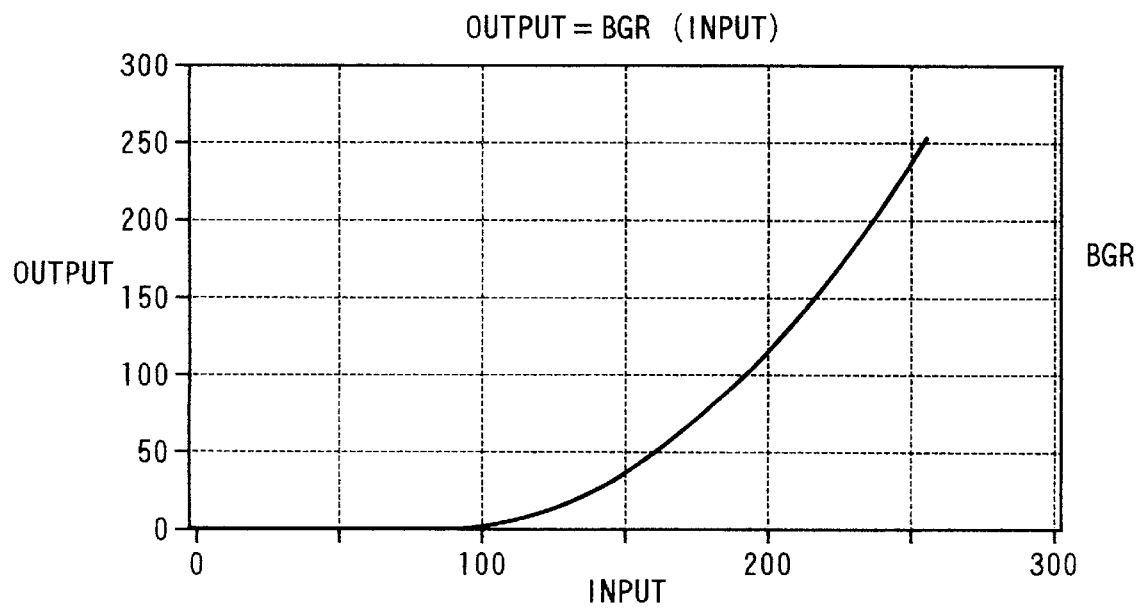
FIG. 6 is a diagram showing an example of a BGR( ) function in the first embodiment.

In the embodiment, by using the BGR( ) function shown in FIG. 6, values of bgrCMY corresponding to 0 to 255 are formed as a table and a conversion from minCMY to bgrCMY is executed.

As shown in FIG. 6, in the embodiment, the BGR( ) function is equal to 0 in a low density portion of an arbitrary value or less. When it exceeds the arbitrary value, the BGR( ) smoothly rises by a quadratic curve. Thus, since K is not included in the low density portion, a color reproducibility of a low density portion such as skin color or the like is improved.

A value ucrCMY indicative of an amount to reduce the multivalue level of each of Y, M, and C in the UCR process is obtained on the basis of the value of minCMY (1005). Now, assuming that a function to obtain ucrCMY is set to UCR( ), it is $$ucrCMY = UCR(minCMY)$$

Figure 5:
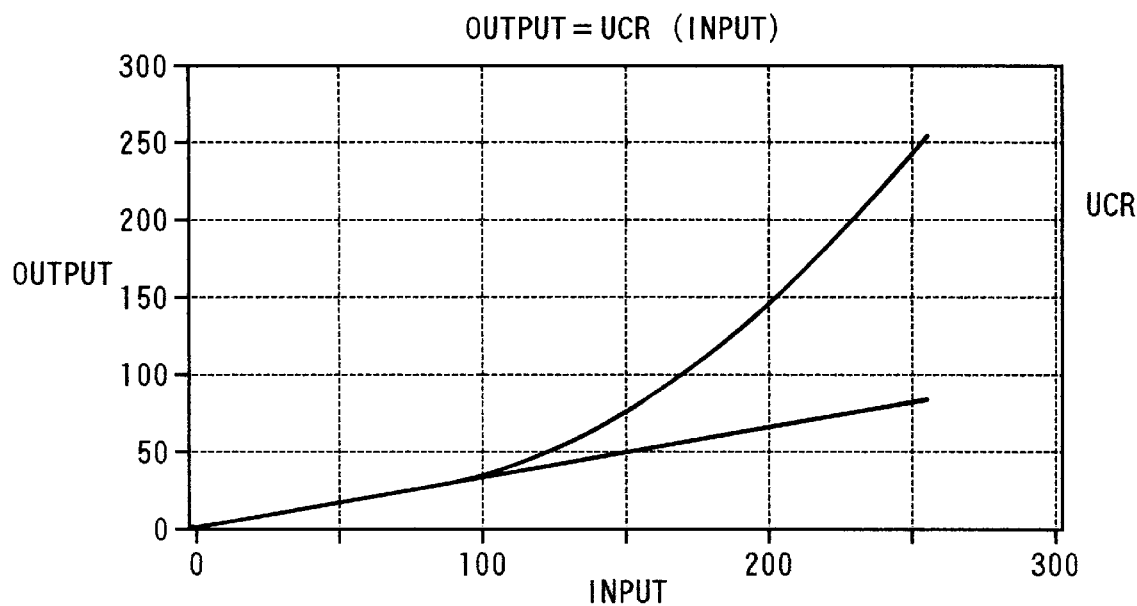
FIG. 5 is a diagram showing an example of a UCR( ) function in the first embodiment.

In the embodiment, by using the function (solid line in a graph) of UCR( ) shown in FIG. 5, values of ucrCMY corresponding to 0 to 255 are formed as a table and a conversion from minCMY to ucrCMY is executed. Subsequently, the processes of the following equations are executed by using the values of C, M, and Y in (1001–1003) and the values of ucrCMY and bgrCMY obtained by the processes in (1004, 1005) (1007–1010).

$$C = C - ucrCMY$$
$$M = M - ucrCMY$$
$$Y = Y - ucrCMY$$
$$K = bgrCMY$$

The sum (C+M+Y+K) of the color emission or implantation quantities is restricted by the UCR( ) and BGR( ) functions so that it lies within the double value of the maximum value of the multivalue level. In case of the embodiment, the UCR ( ) and BGR( ) functions are set so as to satisfy $$ucrCMY - bgrCMY \geq minCMY/3$$

so as to obtain $$C+M+Y+K \leq 255 \times 2$$

In the UCR & black generating processes in 1007 to 1010, by holding the relation between ucrCMY and bgrCMY as mentioned above, the total quantity of the color emission or implantation quantities can be restricted in a state in which each image data is at the multivalue level.

Since ucrCMY and bgrCMY are set as shown in FIGS. 5 and 6, bgrCMY has the maximum value (255) of the output in the maximum value (255) of the input. In ucrCMY, it has the maximum value of the output in the maximum value (255) of the input. Therefore, when $C_2=M_2=Y_2=255$, $K_2=255$ and the dots are recorded in single color of K.

Thus, a situation such that another color is mixed into the portion of K of 100% to be inherently recorded in single color of K doesn't occur.

Figure 7:
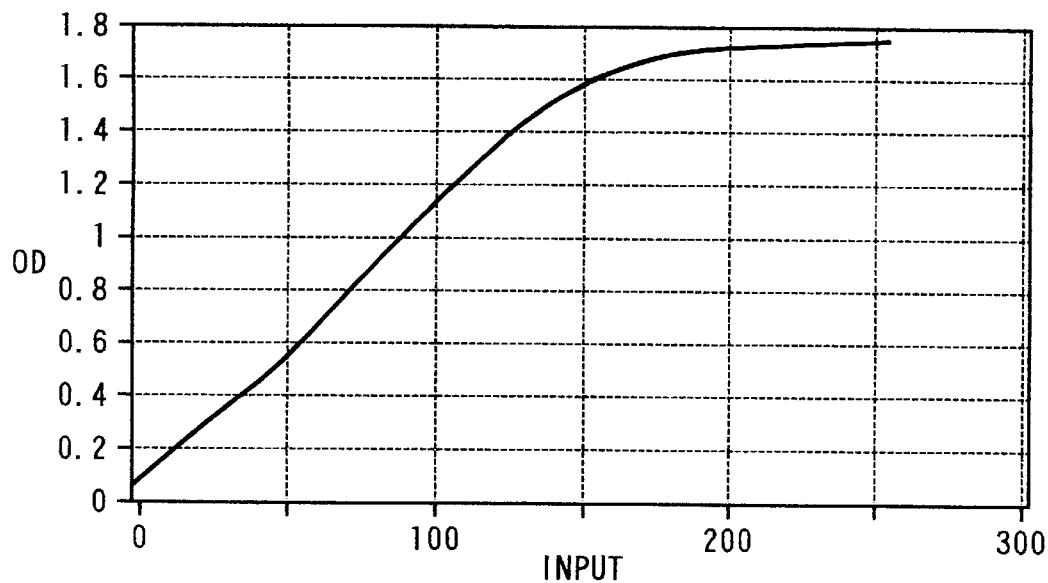
FIG. 7 is a diagram showing an example of the relation between a multivalue level due to the binarization and a reflection density.

Reflection densities (transmission densities in case of a medium of a transmission system) when the multivalue levels subjected to the foregoing UCR & black generating processes are converted into binary values and recorded onto the recording medium are set to functions ODC( ), ODM( ), ODY( ), and ODK( ), respectively. The recording (high resolution recording) at a resolution of [720 dpi (in the lateral direction)×360 dpi (in the vertical direction)] is executed by using ink droplets of 40 pl and the binarization is performed to the multivalues of 0 to 255 by using an error diffusion. It is assumed that the recording medium can contain the ink of 340% for the recording (low resolution recording) at a resolution of [360 dpi (lateral)×360 dpi (vertical)]. The relation between the multivalue level when the recording is executed by using cyan ink under the above conditions and the reflection density is as shown in FIG. 7.

To make the gradation of the recorded image linear, the reflection density has to be proportional to the multivalue level. Therefore, functions fc( ), fm( ), fy( ), and fk( ) which satisfy the following equations for the data of the multivalue levels C, M, Y, and K are used.

$$ODC(fc(C)) = ac \times C + bc$$
$$ODM(fm(M)) = am \times M + bm$$
$$ODY(fy(Y)) = ay \times Y + by$$
$$ODK(fk(K)) = ak \times K + bk$$

where, ac, am, ay, and ak are coefficients of 0 or more. bc, bm, by, and bk denote reflection densities of the recording medium.

In case of the low resolution recording, due to the restrict of the emission or implantation quantity based on the multivalue level in the UCR & black generating processes 1007 to 1010 mentioned above, the emission or implantation quantity doesn't exceed the containable quantity of 340% of the recording medium at the time of the image formation.

On the other hand, in case of the high resolution recording, the emission or implantation quantity per unit area is twice as large as that in the low resolution recording. Therefore, the restrict of the emission or implantation quantity based on the multivalue level in the UCR & black generating processes 1007 to 1010 mentioned above is insufficient.

Therefore, the functions fc( ), fm( ), fy( ), and fk( ) for high resolution recording are obtained as follows.

Now, assuming that the restrict value of the emission or implantation quantity per unit area is set to L and the maximum value level is set to max, the functions fc( ), fm( ), fy( ), and fk( ) are set so that $$L/2 = fc(max)$$
$$= fm(max)$$
$$= fy(max)$$
$$= fk(max)$$

By restricting each color to L/2, the total quantity of the ink emission or implantation quantities when forming a secondary color which is not restricted by the UCR and black generating process can be restricted within L.

In the embodiment, the maximum multivalue level of the emission or implantation quantity is equal to [(255/2)×(340/100)], namely, 433.

Figure 8:
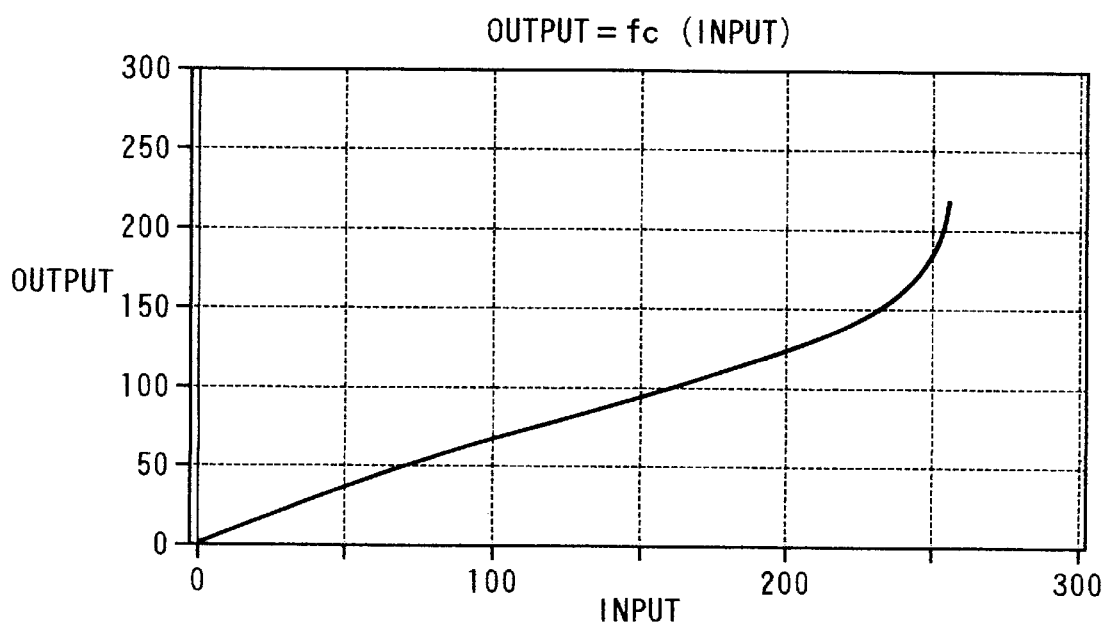
FIG. 8 is a diagram showing an example of an output gamma correction in the first embodiment.

Therefore, in case of cyan, fc(255)=216. The function fc( ) in the embodiment is as shown in FIG. 8.

By using the functions fc( ), fm( ), fy( ), and fk( ) corresponding to the high resolution recording or low resolution recording, the multivalue levels of C, M, Y, and K obtained in 1007 to 1010 are subjected to an output gamma correction and/or a restriction of an emission or implantation quantity in 1011 to 1014, thereby obtaining the multivalue levels C, M, Y, and K. That is, the processes of the following equations are executed.

$$C = fc(C)$$
$$M = fm(M)$$
$$Y = fy(Y)$$
$$K = fk(K)$$

where, as functions fc( ), fm( ), fy( ), and fk( ), the functions suitable for the recording mode selected by the CPU 71 are set.

The multivalue levels C, M, Y, and K obtained by the above processes are binarized in 1015 to 1018, thereby obtaining binary data c, m, y, and k of yellow, magenta, cyan, and black (1019–1022).

According to the above processes, in 1007 to 1010, the maximum value of the total value (C+M+Y+K) of the multivalue levels is restricted to (255×2).

The maximum multivalue level of the maximum emission or implantation quantity in the high resolution recording can be restricted to [255×2×216/255=432] by 1011 to 1014.

Namely, when converting into the value in the low resolution recording, it is equal to [432/(255/2)×100=about 338%]. The ink emission or implantation quantity in the high resolution recording can be suppressed within the containable quantity of the recording medium.

In 1011 to 1014, since the gamma correction according to the recording mode is executed by the setting of the CPU 71, the gradation of the recorded image can be strictly made linear.

Further, since the gamma correction and the restriction of the emission or implantation quantity are integrated, a jump of the gradation which occurs due to the restriction of the emission or implantation quantity and the gamma correction can be minimized.

In the embodiment 1, although the emission or implantation quantity has been restricted in accordance with the resolution, the invention is not limited to such an example but, for example, an image recording method can be also changed.

Namely, since a similar problem also occurs in an image recording apparatus having a mode for performing a single implantation and a mode for performing an overlap implantation, the invention can be applied. (Embodiment 2)

In the embodiment 1, when an image is formed by any one of yellow, magenta, and cyan colors, the maximum emission or implantation quantity is equal to L/2 and only the half quantity of the limit can be implanted. Therefore, a color gamut is narrowed as compared with the case where the emission or implantation quantity of a single color is implanted up to the limit.

In the embodiment 2, therefore, there will be explained image processes such that an emission or implantation quantity restricting process different from the image formation of a primary color is performed for the image formation of the secondary color or cubic color, thereby making it possible to most effectively use a color space which can be reproduced by a restricted emission or implantation quantity on the basis of the characteristics of the recording medium.

A flow of processes of the UCR & black generation unit 40, gamma correction unit 50, and binarization processing unit 60 in the high resolution recording mode in the image processing apparatus 100 according to the embodiment 2 will now be described with reference to FIG. 9.

Each processing unit is controlled on the basis of the CPU 71 in a manner similar to the embodiment 1.

The maximum emission or implantation quantity in the high resolution recording mode assumes 170% in a manner similar to the embodiment 1.

First, the image data of the multivalue levels of Y, M, and, C is inputted (2001 to 2003). The minimum value minCMY among the multivalue data of Y, M, and C is obtained therefrom (2004). The values obtained by subtracting minCMY from C, M, and Y in (2001–2003) are set to C, M, and Y (2005–2007). Namely, they are expressed by the following equations.

$$C = C - minCMY$$
$$M = M - minCMY$$
$$Y = Y - minCMY$$

As output values which are obtained by 2001 to 2003, when the input image data is the primary color, two components in CMY are set to 0 and, when the input image data is the secondary color and cubic color, one component is set to 0.

The minimum value between C and Y obtained in (2005, 2007) is set to G (2009). The minimum value between C and M obtained in (2005, 2006) is set to B (2010). The minimum value between M and Y obtained in (2006, 2007) is set to R (2011).

As for the output values which are derived in 2009 to 2011, in case of the primary color, three components of GBR are set to 0. In case of the secondary color and the cubic color, two components are set to 0.

The primary color is a color in which two color components among YMC inputted in 2001 to 2003 are equal to the value 0, the secondary color is a color in which one color component is equal to the value 0, and the cubic color is a color in which all of the three color components are not equal to 0.

The arithmetic operations of the following equations are executed (2013–2015) on the basis of the values of C, M, and Y in (2005–2007) and the values of R, G, and B in (2009–2011).

$$C = C - lim1 \times G - lim2 \times B$$
$$M = M - lim3 \times R - lim4 \times B$$
$$Y = Y - lim5 \times R - lim6 \times G$$

where, each of lim1 to lim6 denotes a real number which is equal to or larger than 0 and is less than 1. Thus, the maximum emission or implantation quantity of the secondary color can be limited. When the maximum emission or implantation quantity is equal to a value of up to 170% of the maximum value of the multivalue level, lim1 to lim6 are set so as to satisfy the following expressions.

$$lim1 + lim6 \geq 0.3$$
$$lim2 + lim4 \geq 0.3$$
$$lim3 + lim5 \geq 0.3$$

where, with respect to the R component, for instance, the coefficients (lim3 and lim4) are independently set for the C and M components, respectively.

Therefore, by setting the coefficients lim3 and lim4, the restrict quantities for the C and M components can be freely set.

By adjusting the coefficients lim1 to lim6 in which the maximum emission or implantation quantity is restricted, the quantities of C, M, and Y in the image to be formed can be adjusted. Namely, a hue can be adjusted.

Subsequently, a process to generate the multivalue level K of black by the value of minYMC is executed (2008). Now, assuming that a function to perform such a process is set to BGR( ), black bgrCMY to be generated is obtained by the following equation.

$$bgrCMY = BGR(minCMY)$$

The multivalue level pgrCMY of each of Y, M, and C is obtained by the value of minCMY (2012). Now, assuming that a function to obtain pgrCMY is set to PGR( ), $$pgrCMY = PGR(minCMY)$$

Figure 10:
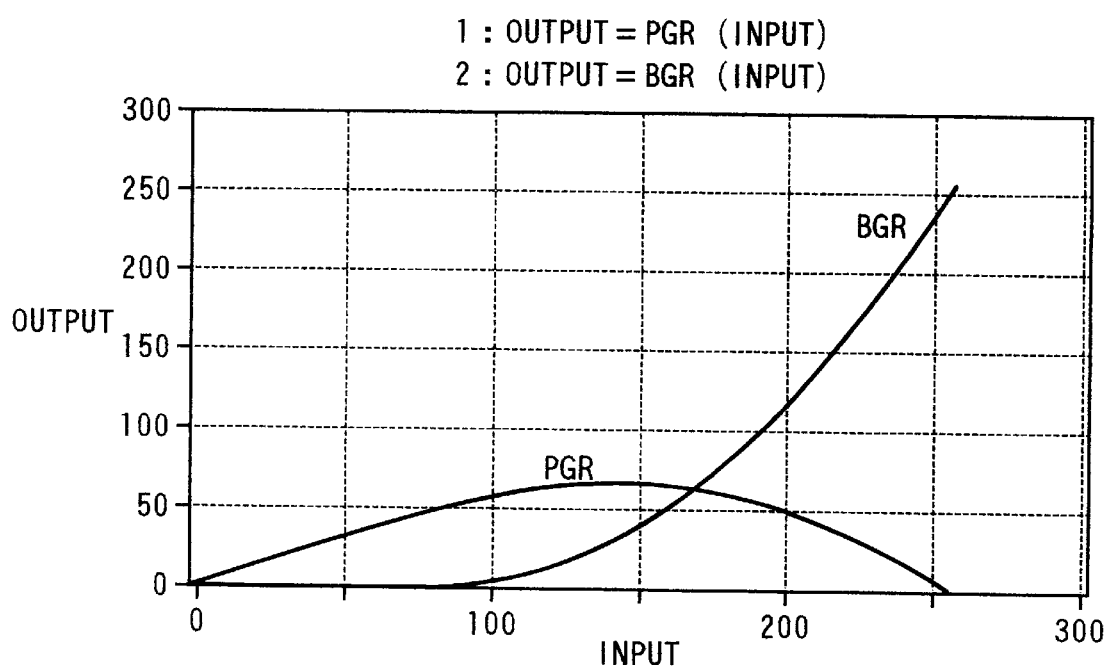
FIG. 10 is a diagram showing an example of a PGR( ) function and a BGR( ) function in the second embodiment.

The process of the following equation is executed (2016–2019) by the values of C, M, and Y in (2013–2015) and the values of pgrCMY and bgrCMY obtained by the processes in (2004, 2008). When the maximum emission or implantation quantity is equal to a value of up to 170% of the maximum value of the multivalue level, the functions of BGR( ) and PGR( ) are set (FIG. 10) so as to satisfy $$pgrCMY \times 3 + bgrCMY < 1.7 \times minCMY$$

By restricting pgrCMY and bgrCMY as mentioned above, the emission or implantation quantity in the cubic color can be restricted to a value of up to 170%.

$$C = C + perCMY$$
$$M = M + perCMY$$
$$Y = Y + perCMY$$
$$K = bgrCMY$$

Subsequently, now assuming that reflection densities (transmission densities in case of the medium of the transmission system) when the multivalue levels are converted into binary values and the dots are recorded onto the recording medium are set to ODC( ), ODM( ), ODY( ), and ODK( ) in a manner similar to the foregoing embodiment, in order to make the gradation of the recorded image linear, the reflection density has to be proportional to the multivalue level. Therefore, the functions fc( ), fm( ), fy( ), and fk( ) which satisfy the following equations are used for the data of the multivalue levels C, M, Y, and K, respectively.

$$ODC(fc(C)) = ac \times C + bc$$
$$ODM(fm(M)) = am \times M + bm$$
$$ODY(fy(Y)) = ay \times Y + by$$
$$ODK(fk(K)) = ak \times K + bk$$

where, ac, am, ay, and ak are coefficients of 0 or more. bc, bm, by, and bk indicate reflection densities of the recording medium.

The multivalue levels C, M, Y, and K obtained in 2016 to 2019 are subjected to an output gamma correction by using the functions fc( ), fm( ), fy( ), and fk( ), thereby obtaining the multivalue levels C, M, Y, and K, respectively. Namely, the processes of the following equations are executed.

$$C = fc(C)$$
$$M = fm(M)$$
$$Y = fy(Y)$$
$$K = fk(K)$$

In the embodiment, different from the first embodiment, the process to restrict the maximum value of the multivalue level in the output gamma correction is not performed. The multivalue levels C, M, Y, and K obtained by the above processes are binarized in 2024 to 2027, thereby obtaining binary data c, m, y, and k of yellow, magenta, cyan, and black, respectively.

In the embodiment, the total emission or implantation quantity sumCMYK is $$\begin{aligned}sumCMYK = & (C + M + Y) - minCMY \times 3 \\ & - (lim3 + lim5) \times R \\ & - (lim1 + lim6) \times G \\ & - (lim2 + lim4) \times B \\ & + pgrCMY \times 3 \\ & + bgrC'MY\end{aligned}$$

Now assuming that the maximum emission or implantation quantity is equal to a value of up to 170% of the maximum value of the multivalue level, $$\begin{aligned}sumCMYK \leq & (C + M + Y) - minCMY \times 3 \\ & - 0.3 \times (R + G + B) + 1.7 \times minCMY \\ = & (C + M + Y) - 1.3 \times minCMY \\ & - 0.3 \times (R + G + B)\end{aligned}$$

Namely, the primary color can be recorded without being limited.

As for the secondary color, since the calculation $$(C+M+Y)-0.3\times(R+G+B)$$

is executed by 2013 to 2015 and the coefficient of (2–0.3) is multiplied to the maximum level of the multivalues and the emission or implantation quantity is suppressed to 170%, it is restricted to a value that is equal to or less than the maximum emission or implantation quantity. The primary color can be recorded without being limited.

The cubic color is obtained by $$(C+M+Y)-1.3\times minCMY-0.3\times(R+G+B)$$

by 2013 to 2015 and 2016 to 2019. Therefore, even when C=M=Y=255 as a maximum value of the cubic color, the calculation $$(C+M+Y)-1.3\times minCMY$$

is executed. The coefficient of (3–1.3) is multiplied to the maximum level of the multivalues and the emission or implantation quantity is suppressed to 170%, so that it is limited to a value that is equal to or less than the maximum emission or implantation quantity.

According to the embodiment 2 as mentioned above, a restriction of the emission or implantation quantity corresponding to any one of the primary color, secondary color, and cubic color as a feature of the input data can be performed.

Therefore, a color gamut in which the image can be recorded without exceeding the maximum emission or implantation quantity can be effectively used.

By setting the coefficients lim1 to lim6 which are used in 2009 to 2019 to 0, the invention can cope with the low resolution recording.

Namely, the processes according to the resolution of the image recording of the printer can be executed even in the embodiment 2 in a manner similar to the embodiment 1.

(Another embodiment)

Although the image has been formed by using the inks of cyan, magenta, yellow, and black in the above embodiments, in case of a low cost color printer, it is a main stream to record by using the inks of three colors of cyan, magenta, and yellow. In such a case, a processing construction in which the process to obtain bgrCMY from minCMY is eliminated in the processing method of each of the first and second embodiments is used.

Figure 11:
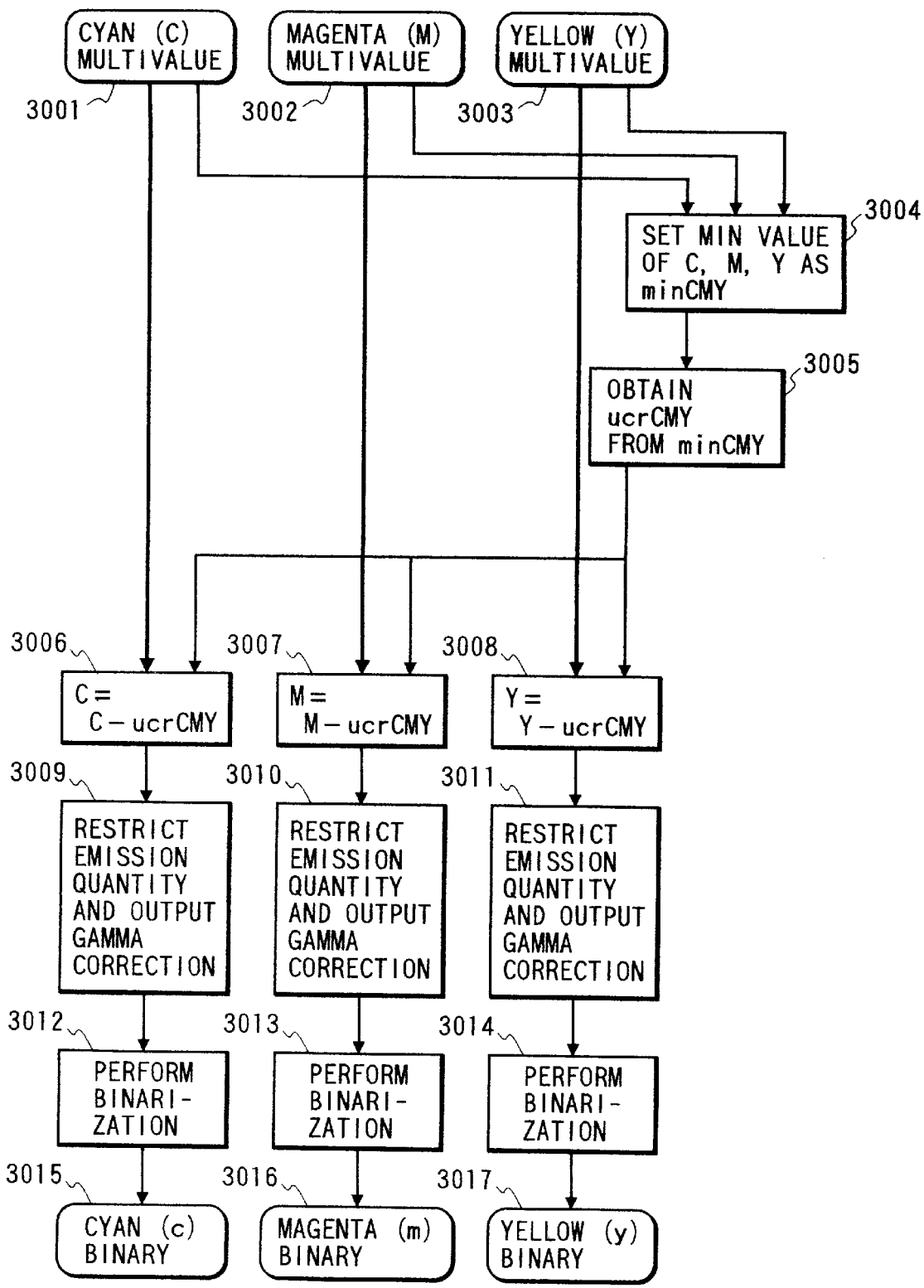
FIG. 11 is a data flowchart showing an example of image data processes according to another embodiment.
Figure 12:
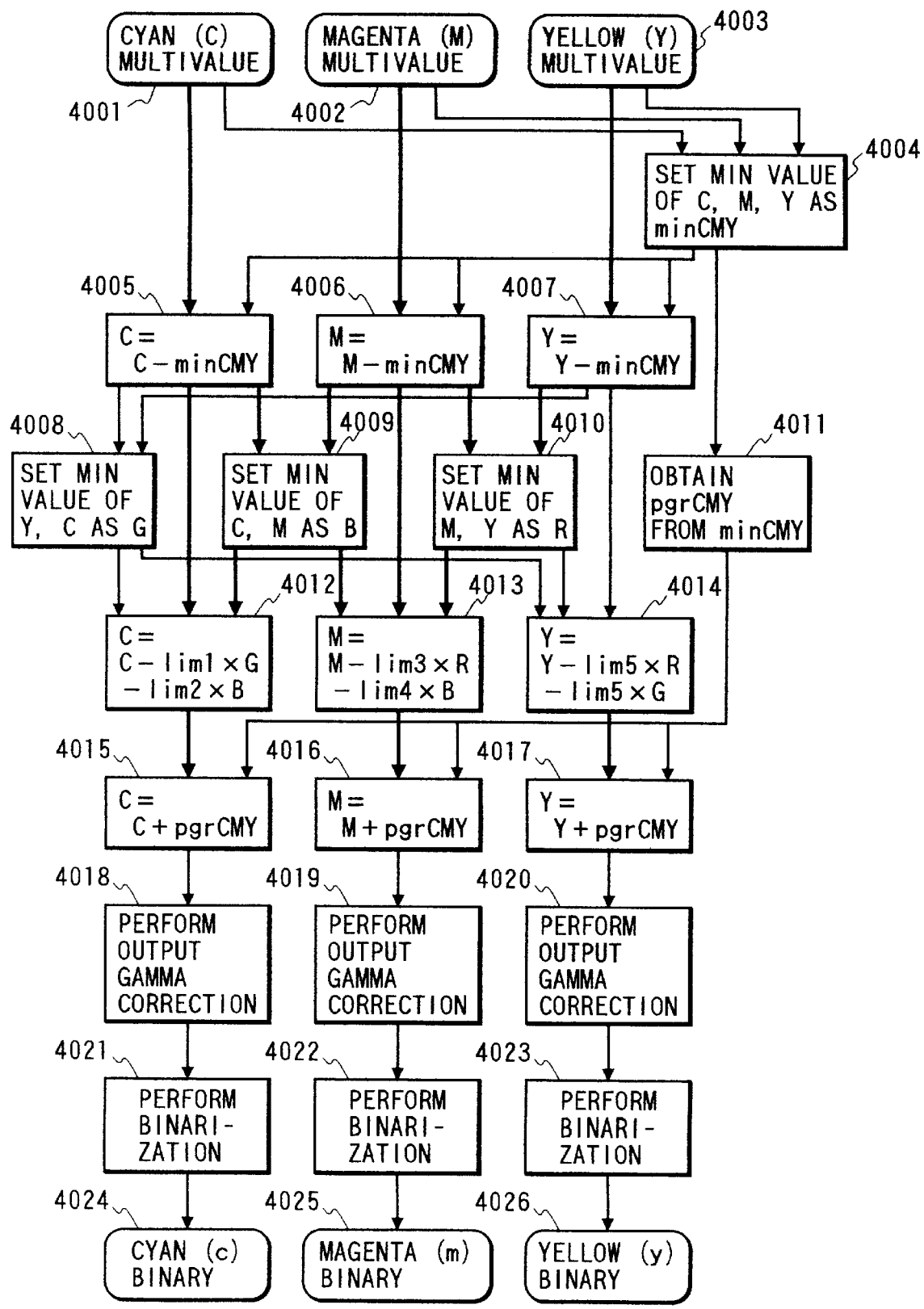
FIG. 12 is a data flowchart showing an example of image data processes according to further another embodiment.

Data flowcharts in such a case are shown in FIGS. 11 and 12. In the data processes, explanation about the processes other than the processes for generating ucrCMY and pgrCMY is omitted because it is similar to that in the foregoing embodiments.

In the embodiment, in case of the image data processes in FIG. 11, the UCR( ) function to generate ucrCMY is a function which satisfies $$ucrCMY=UCR(minCMY)\geq minCMY/3$$

and generally becomes the following function.

$$UCR(minCMY)=minCMY/3$$

In the embodiment, in the image data processes of FIG. 12, when the maximum emission or implantation quantity is equal to a value of up to 170% of the maximum value of the multivalue level, the function of PGR( ) to generate pgrCMY is a function which satisfies $$pgrCMY\times 3\leq 1.7\times minCMY$$

and generally becomes the following function.

$$PGR(minCMY)=1.7\times minCMY/3$$

By using the above functions of UCR( ) and PGR( ), the emission or implantation quantity in the image data processes for recording by the inks of three colors of cyan, magenta, and yellow can be restricted.

The image forming apparatus according to the invention is not limited to the ink jet recording system but can be also applied to an electrophotographic system in which the multivalue recording can be performed.

The invention can be also applied to a head of the type such that a film boiling is caused by a thermal energy and a liquid droplet is emitted and a recording system using such a head.

The invention can be applied to a system constructed by a plurality of equipment (for example, a host computer, an interface equipment, a printer, a reader, and the like) or can be also applied to an apparatus constructed by one equipment (for example, a copying apparatus, a facsimile apparatus, or the like).

It will be obviously understood that the invention can be also applied to a case where the invention is accomplished by a method whereby a memory medium in which programs of a software to accomplish the invention have been recorded is supplied to a system or an apparatus and the system or apparatus reads out the programs stored in the memory medium and executes them. As a memory medium to supply the programs, for example, a floppy disk, a hard disk, an optical disk, a magneto-optic disk, a CD-ROM, a CD-R, a magnetic tape, a non-volatile memory card, an ROM, or the like can be used.

Figure 4:
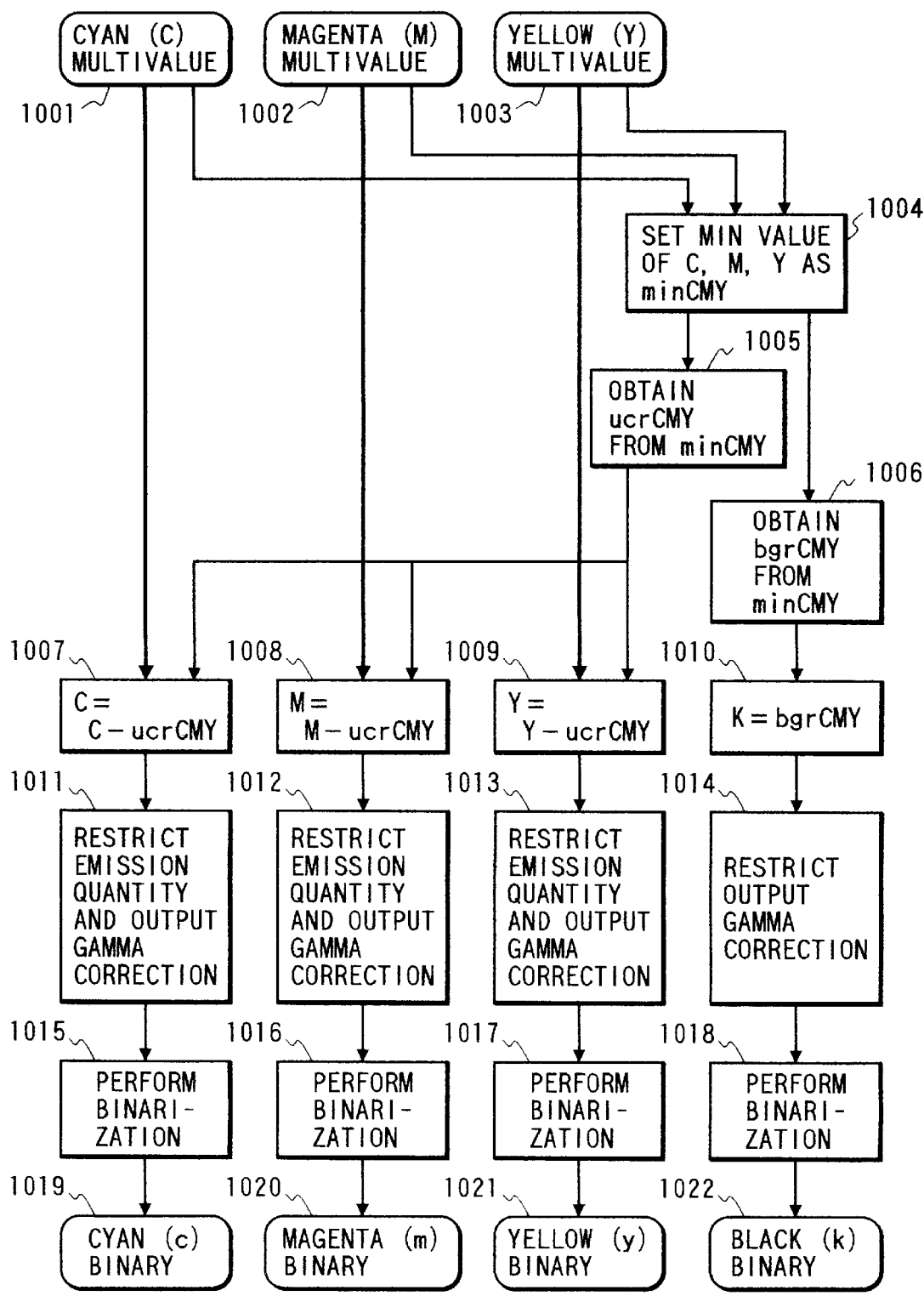
FIG. 4 is a data flowchart showing an example of image data processes according to the first embodiment.
Figure 9:
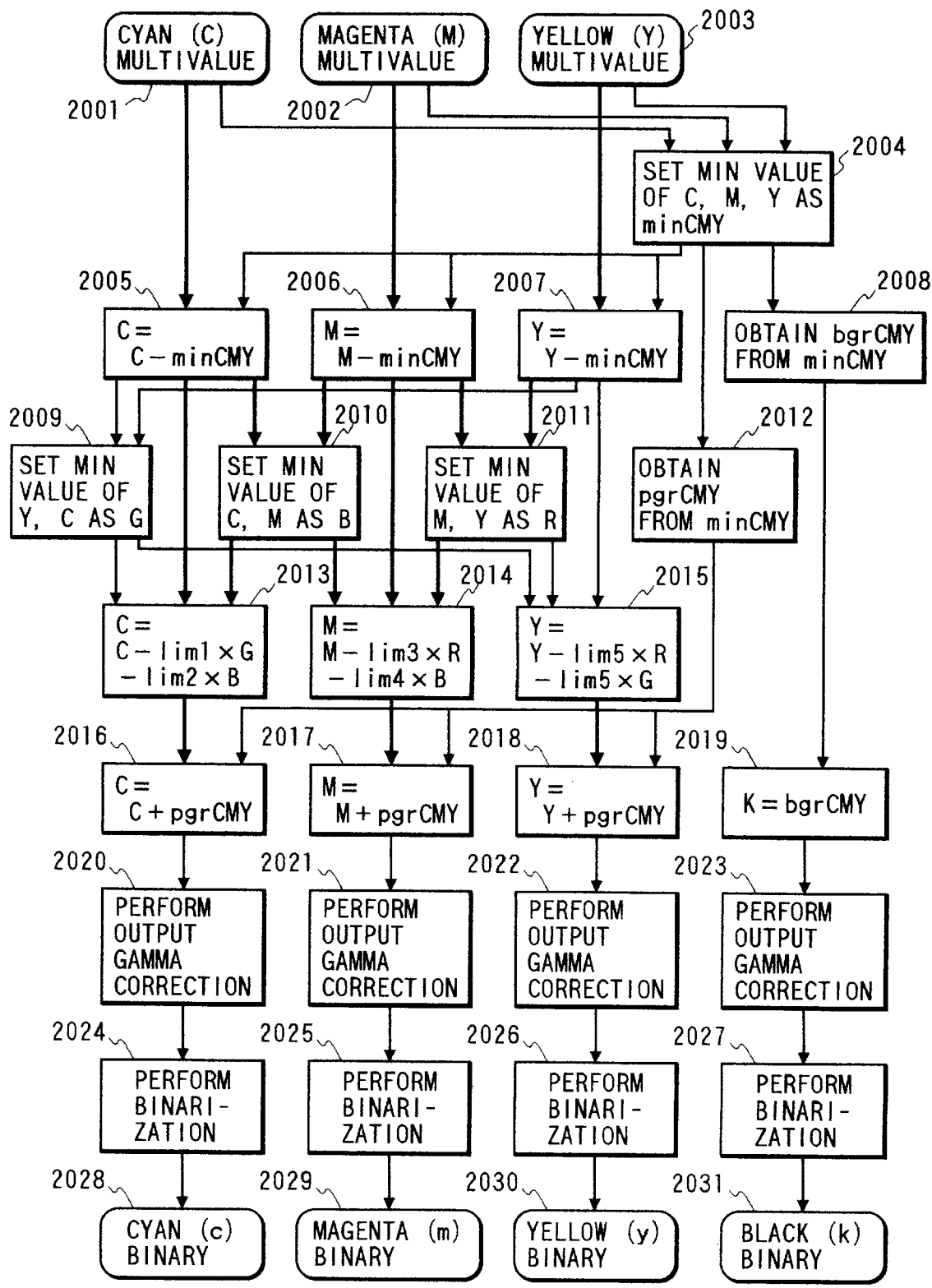
FIG. 9 is a data flowchart showing an example of image data processes according to the second embodiment.

It is also possible to execute the processes shown in the foregoing embodiments by using a table in which the results of the processes shown in FIGS. 4, 9, and 12 have previously been stored.

The present invention is not limited to the foregoing embodiments but many modifications and variations are possible within the spirit and scope of the appended claims of the invention.

What is claimed is:

1. An image processing apparatus comprising:
    input means for inputting image data constructed by a plurality of color components;
    restriction processing means for performing a restricting process to restrict so as not to exceed a predetermined value for said plurality of color components so that a quantity of each recording material which is used in an image recording unit does not exceed a predetermined quantity; and
    output means for outputting the image data subjected to said restricting process to said image recording unit,
    wherein said restriction processing means processes on the basis of a predetermined value in accordance with values of said plurality of color components.

2. An apparatus according to claim 1, wherein said restriction processing means changes the restricting process in accordance with whether said input image data is a primary color or not.

3. An apparatus according to claim 2, wherein said restriction processing means restricts to a different predetermined value in dependence on whether said input image data is a secondary color or a cubic color.

4. An apparatus according to claim 1, further comprising:
    image forming means for forming an image onto a recording medium by using a recording head in which a plurality of nozzles are arranged on the basis of the image data subjected to said restricting process.

5. An apparatus according to claim 1, wherein said restricting process is executed by using a table in which results of said restricting process has previously been stored.

6. An image processing apparatus comprising:
    input means for inputting image data constructed by a first plurality of color components;
    undercolor removing processing means for removing an undercolor for the image data constructed by said first plurality of color components and for generating image data which is constructed by said first plurality of color components and from which the undercolor was removed;
    generating means for generating image data constructed by a second plurality of color components different from the image data of said first plurality of color components on the basis of said image data from which the undercolor was removed; and
    restriction processing means for performing a process to restrict output image data according to the image data constructed by said first plurality of color components so as not to exceed a predetermined value, on the basis of the image data constructed by said second plurality of color components and said undercolor.

7. An apparatus according to claim 6, wherein
    said first plurality of color components are yellow, magenta, and cyan, and
    said second plurality of color components are red, green, and blue.

8. An apparatus according to claim 6, wherein
    said image processing apparatus generates output image data to an image forming apparatus which can form an image at a different resolution, and
    said restriction processing means executes a different process in accordance with said resolution.

9. An apparatus according to claim 6, further having:
    first processing means for processing said undercolor by using a first function;
    second processing means for processing said undercolor by using a second function; and
    synthesizing means for synthesizing said image data subjected to said restricting process and image data processed by using said first function.

10. An apparatus according to claim 6, wherein said first and second functions have a predetermined relation according to a quantity of each recording material which can form an image of an image forming apparatus.

11. An image processing method comprising:
    an input step of inputting image data constructed by a plurality of color components;
    a restriction processing step of performing a restricting process to restrict so as not to exceed a predetermined value for said plurality of color components so that a quantity of each recording material which is used in an image recording unit does not exceed a predetermined quantity; and
    an output step of outputting the image data subjected to said restricting process to said image recording unit,
    wherein in said restriction processing step, the process is executed on the basis of a predetermined value in accordance with values of said Plurality of color components.

12. A recording medium for storing programs to execute a processing comprising:
    an input step of inputting image data constructed by a plurality of color components;
    a restriction processing step of performing a restricting process to restrict so as not to exceed a predetermined value for said plurality of color components so that a quantity of each recording material which is used in an image recording unit does not exceed a predetermined quantity; and
    an output step of outputting the image data subjected to said restricting process to said image recording unit,
    wherein in said restriction processing step, the process is executed on the basis of a predetermined value in accordance with values of said plurality of color components.

13. An image processing method comprising:
    an input step of inputting image data constructed by a first plurality of color components;

an undercolor removing processing step of removing an undercolor for the image data constructed by said first plurality of color components and for generating image data which is constructed by said first plurality of color components and from which the undercolor was removed;

a generating step of generating image data constructed by a second plurality of color components different from the image data of said first plurality of color components on the basis of said image data from which the undercolor was removed; and a restriction processing step of performing a process to restrict output image data according to the image data constructed by said first plurality of color components so as not to exceed a predetermined values, on the basis of the image data constructed by said second plurality of color components and said undercolor.

14. A recording medium for storing programs to execute a processing comprising:

an input step of inputting image data constructed by a first plurality of color components;

an undercolor removing processing step of removing an undercolor for the image data constructed by said first plurality of color components and for generating image data which is constructed by said first plurality of color components and from which the undercolor was removed;

a generating step of generating image data constructed by a second plurality of color components different from the image data of said first plurality of color components on the basis of said image data from which the undercolor was removed; and a restriction processing step of performing a process to restrict output image data according to the image data constructed by said first plurality of color components so as not to exceed a predetermined value, on the basis of the image data constructed by said second plurality of color components and said undercolor.

15. An image processing apparatus comprising:

input means for inputting image data constructed by a plurality of color components;

restriction processing means for executing a restriction processing corresponding to a hue of the image data for the color components, so that a quantity of each recording material which is used in an image recording unit does not exceed a predetermined quantity; and output means for outputting the image data subjected to said restricting process to said image recording unit.

16. An apparatus according to claim 15, wherein said restriction processing means changes the restriction process in accordance with whether said input image data is a primary color or not.

17. An apparatus according to claim 15, further comprising image forming means for forming an image onto a recording medium by using a recording head in which a plurality of nozzles are arranged on the basis of the image data subjected to said restriction process.

18. An apparatus according to claim 15, wherein said restriction process is executed by using a table in which results of said restriction process have previously been stored.

19. An apparatus according to claim 15, wherein said color components are CMY.

20. An apparatus according to claim 16, wherein said restriction processing means generates image data constructed by a plurality of color components including black from image data constructed by CMY color components.

21. An image processing method comprising the steps of:

an input step for inputting image data constructed by a plurality of color components;

a restriction processing step for performing a restricting process to restrict so as not to exceed a predetermined value for said plurality of color components so that a quantity of each recording material which is used in an image recording unit does not exceed a predetermined quantity; and an output step for outputting the image data subjected to said restricting process to said image recording unit, wherein said restriction process step processes on the basis of a predetermined value in accordance with values of said plurality of color components.

22. A memory medium storing computer-executable process steps, the process steps comprising:

input step for inputting image data constructed by a plurality of color components;

restriction processing step for performing a restricting process to restrict so as not to exceed a predetermined value for said plurality of color components so that a quantity of each recording material which is used in an image recording unit does not exceed a predetermined quantity; and output step for outputting the image data subjected to said restricting process to said image recording unit, wherein said restriction process step processes on the basis of a predetermined value in accordance with values of said plurality of color components.

* * * * *

UNITED STATES PATENT AND TRADEMARK OFFICE
CERTIFICATE OF CORRECTION

PATENT NO. : 5,887,124

DATED : March 23, 1999

INVENTORS : Osamu Iwasaki, et al.

It is certified that error appears in the above-identified patent and that said Letters Patent is hereby corrected as shown below:

COLUMN 6

Line 65, "applied. (Embodiment 2)" should read
-- applied.
(Embodiment 2)--.

COLUMN 12

Line 46, "Plurality" should read --plurality--.

COLUMN 13

Line 15, "values," should read --value,--.

Signed and Sealed this

Twelfth Day of October, 1999

Attest:

Q. TODD DICKINSON

*Attesting Officer*  *Acting Commissioner of Patents and Trademarks*